(12) United States Patent
Palumbo

(10) Patent No.: US 7,731,779 B2
(45) Date of Patent: Jun. 8, 2010

(54) METHOD FOR PROCESSING LANDFILL AND OTHER STRANDED GAS CONTAINING COMMERCIAL QUANTITIES OF METHANE AND CONTAMINATED BY CARBON DIOXIDE, NITROGEN AND OXYGEN INTO A PIPELINE OR VEHICLE QUALITY NATURAL GAS PRODUCT

(76) Inventor: David J. Palumbo, 2250 Dabney Rd., Richmond, VA (US) 23230

( * ) Notice: Subject to any disclaimer, the term of this patent is extended or adjusted under 35 U.S.C. 154(b) by 698 days.

(21) Appl. No.: 11/553,931

(22) Filed: Oct. 27, 2006

(65) Prior Publication Data

US 2007/0095205 A1    May 3, 2007

Related U.S. Application Data

(60) Provisional application No. 60/731,636, filed on Oct. 28, 2005.

(51) Int. Cl.
*B01D 53/02* (2006.01)
(52) U.S. Cl. .................. 95/52; 95/96; 95/143; 96/135; 96/136; 96/143
(58) Field of Classification Search .................. 95/51, 95/52, 95, 96, 143; 96/134, 135, 136, 143
See application file for complete search history.

(56) References Cited

U.S. PATENT DOCUMENTS 6,071,326 A * 6/2000 Hall .............................. 95/41

2006/0248921 A1 * 11/2006 Hosford et al. ............... 62/611

\* cited by examiner

*Primary Examiner*—Robert A Hopkins
(74) *Attorney, Agent, or Firm*—Gibson, Dunn & Crutcher LLP

(57) ABSTRACT

Stranded natural gas, when contaminated by difficult to remove constituents such as Nitrogen and Oxygen, has long been considered uneconomical to process into pipeline quality gas and is abandoned or utilized in other energy applications where economically viable. Landfill Gas (LFG) is often considered a stranded gas although in many instances it is available at reasonable distances to natural gas pipelines, and has only rarely been processed for injection into natural gas pipelines. Other stranded contaminated gases, such as gases vented from remote oil wells or coal beds where access to transportation pipelines is not feasible are also candidates for collection. In many instances, billions of cubic feet of methane rich LFG has been vented or flared into the atmosphere. The present invention utilizes a variety of components and provides a product gas that will meet all known pipeline requirements and/or vehicle fuel specifications without the need for blending with pipeline gas and without using cryogenic separation techniques or partial cryogenic processes. The invention also provides a product gas suitable for further processing into Liquefied Natural Gas.

6 Claims, 3 Drawing Sheets

TYPICAL LFG PROCESS STREAM DATA - % VOL

| COMPONENT | 1 RAW GAS | 2 FEED TO PSA | 3 MEM PRODUCT | 4 FEED TO N2 PSA | 5/11 PRODUCT GAS | 6 LPG INJECTION | 7 PIPELINE GAS | 8 TAIL GAS | 9 RECYCLE GAS | 10 PERMEATE |
|---|---|---|---|---|---|---|---|---|---|---|
| CH4 | 47.0% | 43.0% | 83.2% | 82.6% | 97.6% | - | 96.7% | 34.5% | 29.2% | 9.3% |
| CO2 | 45.0% | 49.0% | 5.0% | 5.7% | TRACE | - | TRACE | 23.2% | 63.3% | 87.5% |
| N2 | 6.4% | 5.6% | 10.6% | 10.6% | 2.4% | - | 2.3% | 36.7% | 4.2% | 1.2% |
| O2 | 1.5% | 1.9% | 1.2% | 1.2% | TRACE | - | TRACE | TRACE | 3.2% | 1.8% |
| H2O | 0.1% | 0.08% | 0.0% | 0.0% | 0.0% | - | TRACE | 5.1% | 0.0% | 0.2% |
| H2S | 110 ppm | 8 ppm | 1 ppm | 1 ppm | TRACE | - | TRACE | 1 ppm | 4.6 ppm | 4.3 ppm |
| VOC | 40 ppm | 32 ppm | 0 ppm | 0 ppm | 0 ppm | - | 0 ppm | 0 ppm | 0 ppm | 86 ppm |
| C3H8 | 0% | 0% | 0% | 0% | 0% | 100% | 1.0% | 0% | 0% | 0% |
| PRESSURE | ATMOS. | 200 psig | 190 psig | 180 psig | 170 psig | 170 psig | 165 psig | 5 psig | 1 psig | 1 psig |
| BTU/CF | 475 | 434 | 840 | 834 | 985 | 2517 | 1000 | 348 | 295 | 94 |
| FLOW | 100 | 130 | 51 | 51 | 40 | 0.4 | 41 | 12.5 | 30 | 48 |

FIG.3

METHOD FOR PROCESSING LANDFILL AND OTHER STRANDED GAS CONTAINING COMMERCIAL QUANTITIES OF METHANE AND CONTAMINATED BY CARBON DIOXIDE, NITROGEN AND OXYGEN INTO A PIPELINE OR VEHICLE QUALITY NATURAL GAS PRODUCT

CROSS REFERENCE TO RELATED APPLICATION

The present patent application is related to and claims the benefit of priority from U.S. Provisional Patent Application No. 60/731,636, filed on Oct. 28, 2005, which is hereby incorporated by reference in its entirety.

BACKGROUND OF THE INVENTION

This invention relates to the modular processing of stranded gases with methane components into a natural gas stream suitable for injection into pipelines in the United States and elsewhere without the need for blending with additional pipeline gas or utilizing cryogenic techniques.

In the last two decades nine projects were designed and constructed to process LFG and insert the product gas into natural gas pipelines. Many of these projects failed to provide a continuous acceptable product gas. Some, such as the Dominion Airtech project at the Alliance Landfill near Scranton, Pa., relied on controlling air intrusion at the landfill. None of the projects were able to address conditions where significant nitrogen or oxygen was present in the gas.

Many stranded gas assets exist in the United States. Landfills are a prime example of stranded gas as it is of relatively low quality and flow rate. Many oil wells concurrently produce natural gas with considerable concentrations of contaminants and the gas is very often flared at the site. Industry and government evaluations suggest that at least 25% of the United States natural gas supply contains unacceptable levels of contaminants such as nitrogen, hydrogen sulfide, or other compounds. Carbon dioxide is also a common contaminant and there are several commercial processes that can adequately separate this from methane, the most common of which is amine wash.

LFG, as produced by the anaerobic digestion of municipal organic wastes, is nominally a 55/45 mixture of methane and carbon dioxide, with trace contaminants of siloxane compounds, hydrogen sulfide and a number of volatile organic compounds (VOC's). The LFG collection is aided by the operation of blowers that create a negative pressure in the landfill. This negative pressure causes air infiltration into the LFG stream, especially at the periphery of the landfill where gas wells exist primarily to reduce the migration of LFG (and its corresponding odors) to nearby properties. This air infiltration introduces nitrogen and oxygen into the LFG. This contaminated gas stream has yet to be processed successfully. In the United States, the only commercially successful projects to process LFG rely either on utilizing only select wells in the landfill where the air content is very low, or blending of a lightly processed LFG stream with large quantities of pipeline gas, sometimes as high as twenty five parts of pipeline gas to one part LFG.

In some instances, LFG has been processed and accepted into pipelines at qualities less than normally required. Unless flows in the pipeline accepting lower quality processed gas render its contaminant contribution insignificant, this lower quality gas can cause difficulties for natural gas end users. Improper or less than optimal treatment of the stranded gas may result in a carryover of landfill gas contaminants into the pipeline and eventually into businesses or residences. Complete treatment of landfill and other non-standard gases will provide additional indigenous and sometimes renewable resources for the well-developed natural gas distribution systems in the United States. Landfill sites also have a major advantage in that they are often located near larger metropolises and corresponding high gas usage areas. Recovery of the uncontaminated methane for use in normal natural gas markets will result in a more efficient use of the energy content than the more usual use of LFG for electrical generation, and its attendant energy conversion losses.

The inventor is unaware of any systems in operation processing landfill or other stranded gases that remove substantially all contaminants, including hydrogen sulfide, non-methane organic compounds (NMOC's), carbon dioxide and air components (nitrogen and oxygen) without some form of cryogenic separation or partial cryogenic processing. Cryogenic processes are very capital intensive and use significant amounts of energy during production. They are not economic options for modest or smaller gas flows as normally encountered at landfills and other stranded gas production sites. Other types of systems employed on LFG projects including high pressure membranes, solvent based partial cryogenic systems such as Selexol® or Kryosol®, or most pressure (or temperature) swing absorption systems are not suitable for gas streams with air components and in most cases rely on significantly higher pressure requirements.

SUMMARY OF THE INVENTION

The various modular components described herein will be sized to treat each specific stranded raw gas stream. In some cases, where pipeline specifications allow, a particular part of the process may be omitted. For example, if the incoming gas stream has a concentration of 1% oxygen and the pipeline specification allows only 0.02% by volume of oxygen, the process will utilize an oxygen catalyst to remove nearly all oxygen. If the pipeline specification allowed 0.2% oxygen, an O2 catalyst is not necessary.

The present invention eliminates the need for cryogenic separation of contaminated stranded gas resources with commercially recoverable amounts of methane contents and utilizes processes requiring pressures lower than any processes now in service on LFG. The process takes methane laden gas streams contaminated with CO2, nitrogen and oxygen and other elements or compounds, and provides a clean methane rich product suitable for injection into an interstate or local distribution pipeline without the need for blending with the pipeline gas and without requiring cryogenic separation.

The process according to the present invention utilizes modular components. The process involves delivering raw gas under pressure to the components. In a preferred embodiment, the process removes nearly all contaminants including hydrogen sulfide, non-methane organic compounds (NMOC's), volatile organic compounds (VOC's), carbon dioxide, nitrogen, oxygen, and water vapor, resulting in a product gas containing a minimum content of methane to allow insertion into most interstate pipeline or local distribution natural gas systems. Economical recovery is dependent on the quantity of methane recovered.

BRIEF DESCRIPTION OF THE DRAWINGS

FIG. 3 is a tabulation of the approximate predicted gas flows and compositions for each stream in an exemplary embodiment of the invention.

DETAILED DESCRIPTION

Figure 1:
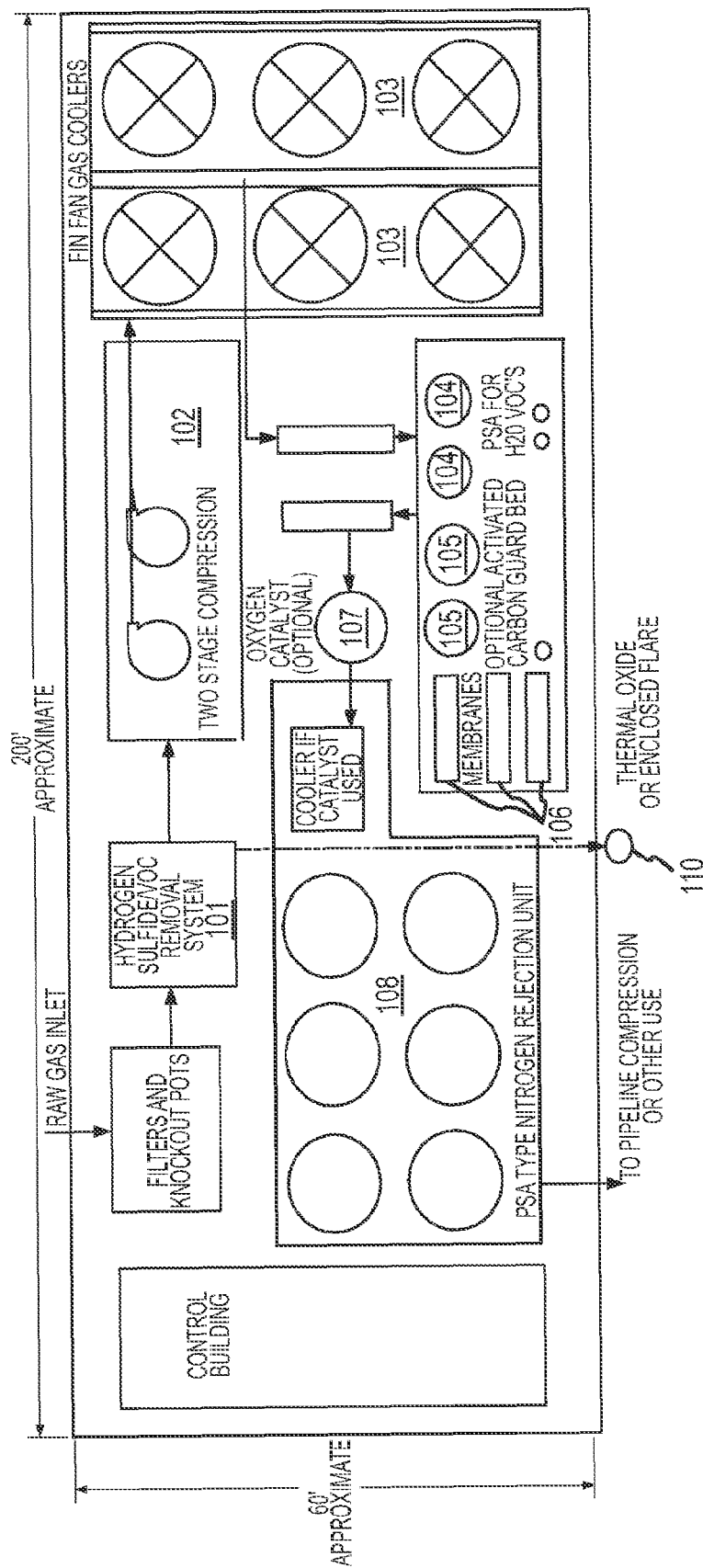
FIG. 1 is an arrangement of the various selective treatment modules that either change the characteristics of the gas or modify the components in the gas. The figure depicts their relative physical size and location in the process areas in a preferred embodiment.

The below components are referred to with the reference numbers as indicated:
101 Sulfur Removal
102 LFG Compressors
103 LFG Coolers
104 Pressure Swing Adsp
105 Activated Carbon Beds
106 Membranes
107 Oxygen Catalyst
108 PSA Nitrogen Rejection
109 Metering Station
110 Thermal Oxidizer
111 Propane Injection
112 Pipeline Gas Compressor
113 Electric Generator FIG. 1 shows the relative size and arrangement of the components in a preferred embodiment.

Figure 2:
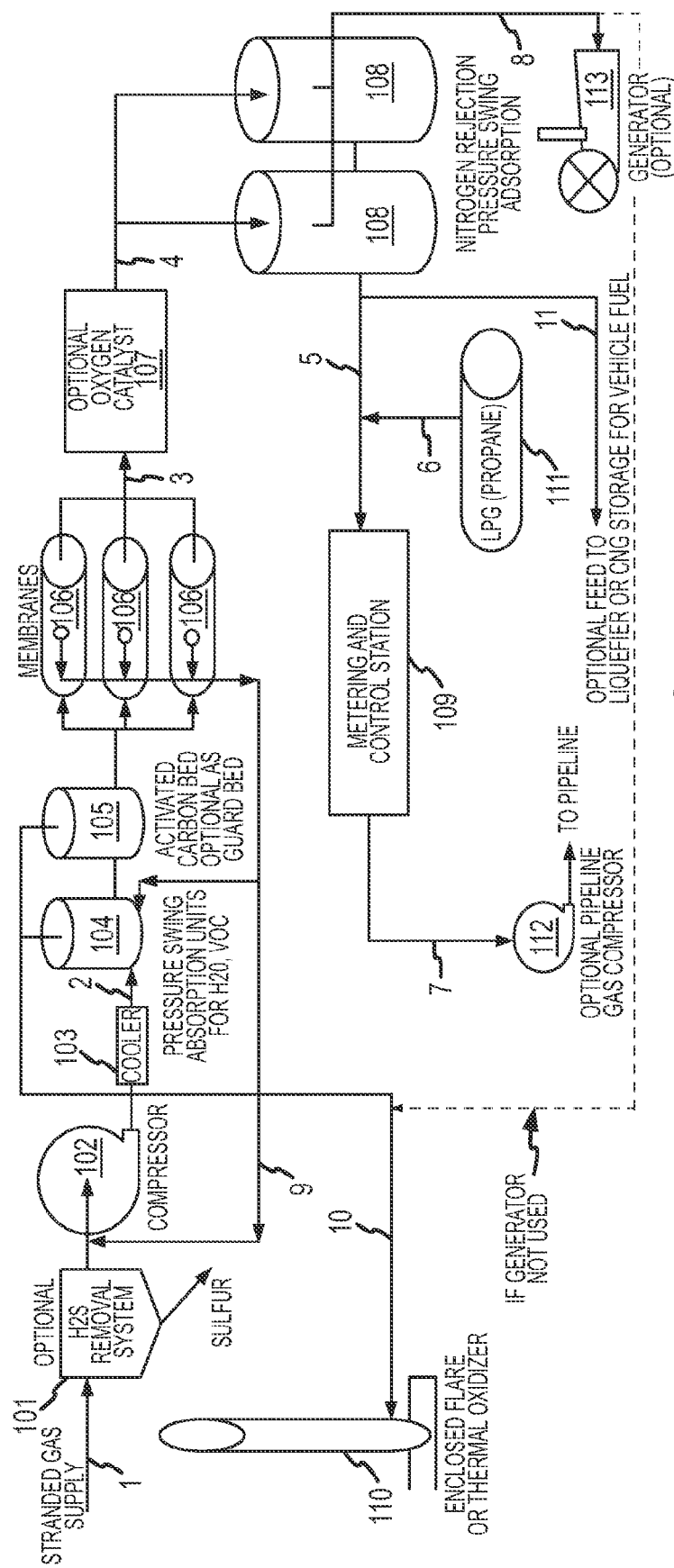
FIG. 2 is a process flow schematic of each component and its location in the processing stream, each part of the process flow having a reference stream number.

FIG. 2 shows the supply of the raw gas to the inlet of a system according to the present invention. Stream 1 is the initial raw gas, and it flows through a hydrogen sulfide removal system (101). This system could be an iron sponge type or a proprietary system like the Lo-Cat™ as manufactured by Gas Technology Products LLC. Hydrogen sulfide is reduced from concentrations of up to 2000 parts per million to less than 8 parts per million. After leaving the Lo-Cat unit, the gas is compressed in compressors (102) and is cooled in fin-fan or similar coolers (103) and becomes gas Stream 2. Stream 2 then enters pressure swing adsorbent (PSA) vessels (104) for removal of water and nearly all non methane organic compounds (NMOC's) and volatile organic compounds (VOC's) utilizing adsorbents specifically selected for this purpose. When regenerated, the PSA's utilize either ambient air or the CO2 rich permeate stream described below and this gas stream 10 containing the collected VOC's and NMOC's is sent to an enclosed flare or thermal oxidizer (110) for combustion in accordance with EPA standards. The gas stream 2 enters non-regenerative activated carbon beds (105) if high concentrations of siloxanes are present in the raw gas, as a final step to reduce NMOC's including siloxanes and VOC's to nearly undetectable levels. Leaving the PSA's and carbon beds, stream 2 is dry compressed gas consisting of $CH_4$, $N_2$, $O_2$, and $CO_2$ and is directed to the process membranes (106). These membranes selectively remove most of the carbon dioxide and some oxygen, while passing the bulk of the methane and nitrogen. The membranes may be a single or dual stage depending on economics of methane recovery. The reject stream of gas, called permeate, is rich in carbon dioxide and of very low pressure, and is either recycled back to the inlet of the compressors (102) or used as the regenerative gas for the PSA's described above and then sent to the thermal oxidizer or enclosed flare as stream 10. If the raw gas contains concentrations of oxygen higher than 2%, and the receiving pipeline has requires less than 10% of that amount, then the product gas from the membranes, stream 3, is directed to an oxygen catalyst bed (107). This catalyst bed, an example of which is a unit manufactured by BCCK Inc, reduces entrained oxygen to less than 10 parts per million. Oxygen reduction in the catalyst results in the formation of water vapor and CO2. This gas (stream 4) is then directed to another set of PSA's with adsorbents selective in the separation of methane and nitrogen (108). An example of this technology is the Molecular Gate™ provided by BASF. This PSA removes nearly all of the remaining carbon dioxide, all of the water vapor that may have been produced in the $O_2$ catalyst, and approximately 75% of both nitrogen and oxygen entrained in gas stream 4. The product gas, stream 5, is suitable for injection into pipelines with a minimum heat content requirement of 965 BTU per cubic foot. The gas in stream 5 is pure enough to also be a feedstock for Liquefied Natural Gas production (the stream is denoted as stream 11 if it is used as an optional feed to a liquefier or compressed natural gas storage). Should the receiving pipeline require greater than 965 BTU per cubic foot heat content of the product gas (or other predetermined threshold), Liquefied Petroleum Gas (LPG) from a source (111) can then be injected as stream 6 into the product stream, with a final gas stream 7 having a heat content of 1,000 BTU per cubic foot. A modular metering and control station (109) measures the quantity of gas flowing and determines the amount of LPG required. The product gas is then compressed to the required pipeline requirements by a compressor (112) and delivered for final receipt by the receiving pipeline.

The PSA's used for nitrogen rejection (108) are regenerated by pulling a vacuum on the adsorbent beds. This gas, stream 8, contains approximately 35% methane and may be either flared in the thermal oxidizer (110) or utilized such as in on-site generation units (113), usually reciprocating engines to assist in powering the process equipment.

The table depicted in FIG. 3 is a predicted typical application for a landfill gas stream containing approximately 47% methane along with some carbon dioxide, nitrogen, oxygen, water vapor and hydrogen sulfide. The table depicts the approximate concentrations of each component of the gas stream, with a stream number correlating to this description, at each relevant point in the process and eventually showing the sales gas, whether it be for pipeline gas or feedstock for LNG or vehicle fuel. The table assumes an inlet gas amount of 100 as the basis, this could be 100 standard cubic feet, 100 cubic meters, etc. and the volumetric concentrations of each component as a percentage of that gas stream point.

What is claimed is:

1. A method of processing stranded gas containing methane comprising the steps of:
   removing hydrogen sulfide from the gas;
   compressing the gas;
   cooling the gas;
   removing water, non methane organic compounds, and volatile organic compounds using one or more pressure swing adsorption units;
   removing carbon dioxide and oxygen using process membranes; and
   removing nitrogen and oxygen using one or more pressure swing adsorption units;
   wherein the step of removing carbon dioxide and oxygen using process membranes produces permeate which is then used in the step of recycling the gas to improve methane recovery.

2. The method of claim 1 wherein the step of removing water, non methane organic compounds, and volatile organic compounds uses activated carbon beds.

3. The method of claim 1 wherein the processing does not use cryogenic components.

4. A method of processing stranded gas containing methane comprising the steps of:
- removing hydrogen sulfide from the gas;
- compressing the gas;
- cooling the gas;
- removing water, non methane organic compounds, and volatile organic compounds using one or more pressure swing adsorption units;
- removing carbon dioxide and oxygen using process membranes; and
- removing nitrogen and oxygen using one or more pressure swing adsorption units;

wherein the step of removing carbon dioxide and oxygen using process membranes produces permeate which is then used in the step of removing water, non methane organic compounds, and volatile organic compounds using one or more of pressure swing adsorption units.

5. The method of claim 4 wherein the step of removing water, non methane organic compounds, and volatile organic compounds uses activated carbon beds.

6. The method of claim 4 wherein the processing does not use cryogenic components.

* * * * *